(12) United States Patent
Guo et al.

(10) Patent No.: US 8,102,721 B2
(45) Date of Patent: Jan. 24, 2012

(54) PSEUDO DUAL-PORT MEMORY

(75) Inventors: Shuwei Guo, Beijing (CN); Hui Fu, Shaanxi (CN); Lei Zhang, Beijing (CN); Xiandi Wan, Xi'an (CN)

(73) Assignee: Infineon Technologies AG, Neubiberg (DE)

( * ) Notice: Subject to any disclaimer, the term of this patent is extended or adjusted under 35 U.S.C. 154(b) by 4 days.

(21) Appl. No.: 11/768,968

(22) Filed: Jun. 27, 2007

(65) Prior Publication Data

US 2009/0003119 A1  Jan. 1, 2009

(51) Int. Cl.
*G11C 7/10* (2006.01)
(52) U.S. Cl. .............. 365/189.05; 365/230.05
(58) Field of Classification Search .......... 365/189.04, 365/230.05
See application file for complete search history.

(56) References Cited

U.S. PATENT DOCUMENTS

| | | | |
|---|---|---|---|
| 5,142,540 A * | 8/1992 | Glasser | 714/772 |
| 6,259,648 B1 | 7/2001 | Kragick | |
| 6,288,970 B1 | 9/2001 | Reddy et al. | |
| 6,778,462 B1 | 8/2004 | Castagnetti et al. | |
| 7,546,424 B1 * | 6/2009 | May et al. | 711/149 |
| 2004/0190364 A1 | 9/2004 | Jung | |
| 2005/0281111 A1* | 12/2005 | Urard et al. | 365/221 |
| 2008/0181040 A1* | 7/2008 | Huang et al. | 365/219 |

FOREIGN PATENT DOCUMENTS

JP          9081449          3/1997

* cited by examiner

*Primary Examiner* — Jason Lappas
(74) *Attorney, Agent, or Firm* — Dicke, Billig & Czaja, PLLC

(57) ABSTRACT

A pseudo dual-port memory device is disclosed. One embodiment provides an internal data RAM for a microprocessor, and a method for operating a memory device. In one embodiment, a memory device for a microprocessor or microcontroller comprises: a first part with memory cells that are single-port memory cells; and a second part with memory cells that are dual-port memory cells. In another embodiment, a method for operating a memory device is provided, the memory device including at least one single-port memory and at least one dual-port memory, the method including: accessing the single-port memory of the memory device when a non-conflicting access is to be carried out at the memory device; and accessing the dual-port memory of the memory device when a conflicting access is to be carried out at the memory device.

18 Claims, 1 Drawing Sheet

PSEUDO DUAL-PORT MEMORY

BACKGROUND

The invention relates to a memory device, in particular, an internal data RAM (iRAM) for a microcontroller or microprocessor, to a microcontroller or microprocessor system, and to a method for operating a memory device.

Conventional microcontroller or microprocessor systems include one or several CPUs (central processing units). The CPU(s) are connected to one or several memory devices, e.g., a program memory, and a data memory, etc.

The memory devices may be provided on the same chip, as the CPU(s) ("embedded" microcontroller or microprocessor system, with respective "internal" memories), or alternatively separately from the CPU(s).

The program memory e.g., may store the sequence of instructions to be executed by the CPU(s)—i.e., the program—, and the data memory e.g., respective variables, e.g., variables to be changed by the CPU(s) when executing the program.

In the case of conventional memory devices, in particular conventional semiconductor memory devices, one differentiates between functional memory devices (e.g., PLAs, PALs, etc.), and table memory devices, e.g., ROM devices (ROM=Read Only Memory)—in particular PROMs, EPROMs, EEPROMs, flash memories, etc.—, and RAM devices (RAM=Random Access Memory or read-write memory), e.g., DRAMs and SRAMs.

In conventional microcontroller or microprocessor systems, as data memory, e.g., a RAM device is used, for instance, an internal dual-port SRAM device with e.g., up to 256 byte or more storage capacity. Alternatively, instead, e.g., an array of flip-flops may be used as data memory.

A RAM device is a memory for storing data under a predetermined address and for reading out the data under this address again later.

Since as many memory cells as possible are to be accommodated in a RAM device, one has been trying to realize them as simple as possible.

In the case of SRAMs (SRAM=Static Random Access Memory), the individual memory cells consist e.g., of few, for instance 4 transistors for the storing of data (in addition to 2 access transistors), and in the case of DRAMs (DRAM=Dynamic Random Access Memory) in general only of one single, correspondingly controlled capacitive element (e.g., a trench capacitor) with the capacitance of which one bit can be stored as charge.

This charge, however, remains for a short time only. Therefore, a "refresh" must be performed regularly, e.g., approximately every 64 ms.

In contrast to that, no "refresh" has to be performed in the case of SRAMs, i.e. the data stored in the memory cell remains stored as long as an appropriate supply voltage is fed to the SRAM.

As the above, in conventional microcontroller or microprocessor systems, as a data memory, e.g., a dual-port SRAM device might be used. A dual-port SRAM (DPSRAM) is a type of SRAM that allows multiple reads or writes to occur at the same time, or nearly the same time, unlike a single-port SRAM which only allows one access at a time. The memory cells of a dual-port SRAM e.g., include 8 transistors, i.e., require more space than single-port SRAM memory cells.

Hence, sometimes it is tried to use SRAMs with single-port memory cells for the implementation of dual-port functionality ("pseudo dual-port SRAMs", such as e.g., described in U.S. Pat. Nos. 6,259,648 B1, 6,778,462 B1, 6,288,970 B1, US 2004/0190364 A1, JP 9081449A1).

For instance, SRAMs with a partitioned array, and single-port memory cells may be used. Such SRAMs may be provided with two (external) SRAM ports; if the two ports simultaneously attempt to access the same partition ("collision"), then one of the accesses must be delayed.

However, the extra code required due to the partitioning, and the above collision detection lead to relatively high costs.

Further, an SRAM with single-port memory cells might be used, which is accessed at twice the speed of an external clock. Such an SRAM may be provided with two (external) SRAM ports; the first SRAM port might be accessed during the first portion of the clock cycle, and the second SRAM port during the second portion of the clock cycle. However, in this technique, an SRAM with relatively high speed performance is required.

For these or other reasons, there is a need for the present invention.

SUMMARY

According to one embodiment of the invention, a memory device for a microprocessor or microcontroller includes a first part with memory cells that are single-port memory cells and a second part with memory cells that are dual-port memory cells.

According to a further embodiment, a method for operating a memory device is provided. The memory device includes at least one single-port memory and at least one dual-port memory. The method includes accessing the single-port memory of the memory device when a non-conflicting access is to be carried out at the memory device and accessing the dual-port memory of the memory device when a conflicting access is to be carried out at the memory device.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
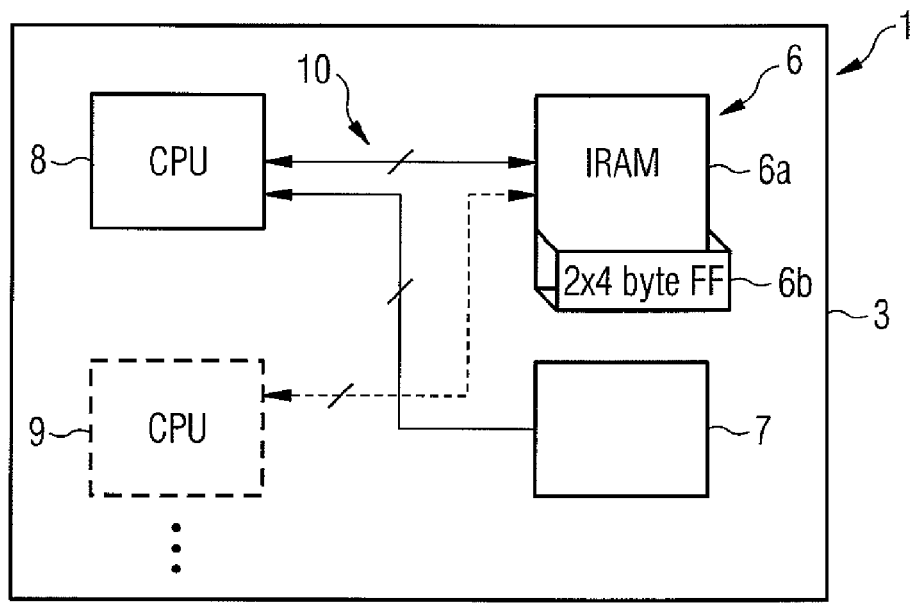
FIG. 1 illustrates a schematic, exemplary representation of an electronic system, including a memory in accordance with one embodiment.

FIG. 1 illustrates a schematic, exemplary representation of an electronic system 1 including a memory 6 in accordance with one embodiment.

In accordance with one embodiment, the memory 6 is arranged on the same semiconductor chip, as the corresponding microcontroller or microprocessor 3, or a corresponding microcontroller or microprocessor chip, respectively.

In alternative, not illustrated embodiments, the memory 6 may also be arranged separately from the microcontroller or microprocessor 3, in particular on a (further) chip that is provided separately from the microcontroller or microprocessor 3.

The microcontroller or microprocessor 3 may include one single Central Processing Unit 8 (CPU), or CPU "core". Alternatively, the microcontroller or microprocessor 3 may include several Central Processing Units 8, 9, e.g., two or four Central Processing Units 8, 9, etc.

The Central Processing Unit or Units 8, 9 may be connected to the memory 6 via one or several respective bus systems 10.

Apart from the memory 6, the microcontroller or microprocessor system 1 may include one or several additional memories 7, also connected to the Central Processing Unit 8 or Units 8, 9.

The (additional) memory 7 or memories may also be provided on the same chip, as the memory 6 and/or Central Processing Unit 8 or Units 8, 9, or in alternative, not illustrated embodiments, may be arranged on a separate chip.

The memory 7 e.g., may serve as program memory, and the memory 6 e.g., as internal data memory.

The program memory 7 e.g., may store the sequence of instructions to be executed by the CPU(s)—i.e., the program—, and the data memory 6 e.g., respective variables, e.g., variables to be changed by the CPU(s) when executing the program.

As program memory 7, e.g., an appropriate, non-volatile memory device, e.g., an EPROM (Erasable PROM) or EEPROM (Electrically Erasable PROM), in particular e.g., a flash EEPROM, may be used. Alternatively, a RAM (RAM=Random Access Memory), in particular e.g., a DRAM (DRAM=Dynamic Random Access Memory), may be used as program memory 7.

Further, in the present embodiment, and as will be described in further detail below, the data memory 6 is formed by a special pseudo multi-port memory 6, here: a specially designed pseudo multi-port internal data RAM (iRAM (RAM=Random Access Memory)).

In particular, and as will be described in further detail below, the data memory 6 may include a RAM 6a, in particular a SRAM 6a (SRAM=Static Random Access Memory)— or several RAMs, in particular, SRAMs. In addition, the data memory 6 in the present embodiment includes one or a plurality of flip-flops 6b.

The data memory 6 in total may e.g., include a storage capacity of e.g., between 64 byte and 2048 byte, in particular, for instance between 128 byte and 512 (or 1024 byte), e.g., about 320 byte or 256 byte, etc., or any other suitable storage capacity.

The flip-flop(s) 6b may be comprised in a respective array, and e.g., may include a storage capacity of e.g., between 1 byte and 32 byte (or 64 byte), or e.g., between 2 byte and 16 byte (or 8 byte), e.g., a storage capacity of 2×4 byte (or e.g., 4×4 byte or e.g., 4×2 byte, etc.), or any other suitable storage capacity.

The array of flip-flop(s) 6b is dual-ported, in particular, allows multiple reads or writes to occur at the same time, or substantially the same time.

In one or more embodiments, instead of the dual-ported array of flip-flops 6b, other suitable dual-port memory devices may be used, e.g., an SRAM with dual-ported SRAM memory cells.

As the above, the data memory 6 in addition to the flip-flop(s) 6b includes one or a plurality of RAMs 6a, in particular, one or a plurality of SRAMs 6a. The RAM 6a, in particular SRAM 6a includes a plurality of memory cells, arranged in respective rows and columns. Each of the memory cells of the RAM or SRAM 6a may be single-port memory cells. Hence, the RAM or SRAM 6a is a single-port RAM or SRAM 6a, respectively, with each of the memory cells of the RAM or SRAM 6a only allowing one access at a time.

Figure 2:
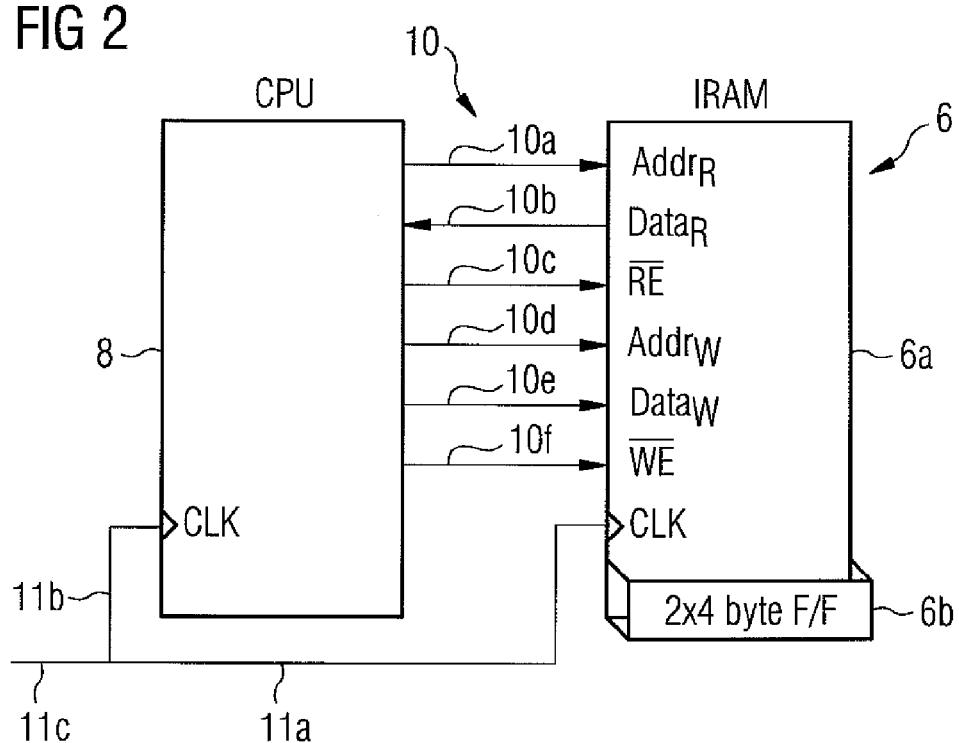
FIG. 2 illustrates a more detailed representation of the CPU and the data memory illustrated in FIG. 1.

As is illustrated in FIG. 2, a clock signal (CLK-signal) is provided via respective lines 11a, 11b, 11c to both the Central Processing Unit 8 (CPU) (CPU "core"), and the data memory 6.

The Central Processing Unit 8 (CPU), or CPU "core" may e.g., be an 8051 or an 8051 compatible CPU core, e.g., —as in the present embodiment—an 8051 compatible CPU core of Infineon®, or any other suitable CPU core.

The above instructions to be executed by the Central Processing Unit 8 (CPU), or CPU "core" may e.g., be 1, 2, or 3 bytes long (or longer), and may take e.g., 1, 2 or 4 CPU cycles to execute.

A CPU machine cycle of the Central Processing Unit 8 (CPU), or CPU "core" may e.g., include two clock periods, defined by the above clock signal (CLK-signal).

Memory accesses to the data memory 6 may take place during one or both phases of the machine cycle.

As the above, the Central Processing Unit 8 is connected to the data memory 6 (here: the above pseudo multi-port internal data RAM 6 (iRAM)) via the above bus system 10.

To read data from the data memory 6/pseudo multi-port internal data RAM 6 (here: the single-port SRAM 6a or the dual-ported array of flip-flops 6b) ("read access"), a signal /RE (Read Enable) on a line 10c of the bus system 10 is activated by the Central Processing Unit 8.

In response thereto, the memory location of the data memory 6 addressed by an address signal $Addr_R$ (Address, Read) provided on respective lines 10a of the bus system 10 will be read, and the data stored at the memory location will be sent via a respective data signal $Data_R$ (Data, Read) on respective lines 10b of the bus system 10 from the data memory 6 to the Central Processing Unit 8.

Correspondingly similar, to write data into the data memory 6/pseudo multi-port internal data RAM 6 (here: the single-port SRAM 6a or the dual-ported array of flip-flops 6b) ("write access"), a signal /WE (Write Enable) on a line 10f the bus system 10 is activated by the Central Processing Unit 8.

In response thereto, data sent via a respective data signal $Data_W$ (Data, Write) on respective lines 10e of the bus system 10 from the Central Processing Unit 8 to the data memory 6 will be stored at the memory location of the data memory 6 addressed by an address signal $Addr_W$ (Address, Write) provided on respective lines 10d of the bus system 10.

Analysis indicated that all data memory 6/(pseudo multi-port) internal data RAM (iRAM) 6 access related instructions can e.g., be classified according to (Infineon® nomenclature used):

the addressing mode:
Rn accesses, e.g., ADD A, Rn
Direct iRAM accesses, e.g., ADD A, dir
Direct iRAM bit accesses, e.g., ANL C, bit
Stack accesses, e.g., PUSH, dir
Indirect memory accesses via Ri, e.g., ADD A, @Ri
and/or the iRAM accessing type:
Read only, e.g., MOV A, dir
Write only, e.g., MOV R0, A
Read_Modify_Write, e.g., INC Rn
Read and Write, e.g., MOV dir, dir
Read Ri, then one of the above accesses, e.g., MOV A, @Ri
and/or the iRAM access times within an instruction cycle:
One time accesses, e.g., read or write, e.g., ADDC A, Rn
Two times accesses, e.g., read and write, e.g., XCH A, dir
Three times accesses, e.g., read, read and write, e.g., XCH A, @Ri Further analysis indicated that:

The iRAM is accessed as dual-port memory only with one read access and one write access simultaneously;

All iRAM access related instructions could be executed individually in a single-port iRAM without resource conflict if a NOP was added between each instruction in the instruction flow; in this case, there would not be any resource conflict any more;

Except instructions with an @Ri, all other iRAM access related instructions are executed only within their own respective instruction cycle;

All indirect addressing instructions are actually converted into direct addressing instructions when the instruction cycles are started;

Except Ri early fetching and RET/RETI, a normal iRAM read access happens only in the first phase of a cycle, and a write access happens only in the second phase of a cycle;

Within the instruction cycle of an instruction, as a maximum 2 times an iRAM access occurs; the access mode can only be read only, write only or read and write.

From the above, it follows that an iRAM resource conflict—where at the same time (or the same clock period or periods, defined by the above clock signal (CLK-signal)) a read access and a write access occurs—only happens in a special case ("conflict case"): with an indirect addressing instruction when in its previous instruction there is a write access to the iRAM.

In the present embodiment, in the above "conflict case", the above dual-port memory device 6b (here: the dual-ported array of flip-flops 6b) of the data memory 6 is accessed, but not the single-port RAM 6a, in particular single-port SRAM 6a of the data memory 6.

As the array of flip-flops 6b is dual-ported, at the same time or substantially the same time (or the same clock period or periods), a read and a write access might be carried out. Therefore, in the "conflict case", the signal /RE (Read Enable) on the line 10c of the bus system 10, and the signal /WE (Write Enable) on the line 10f the bus system 10 might be activated simultaneously or substantially simultaneously (or at the same clock period or periods). Further, the memory location of the array of flip-flops 6b from which data is to be read out might be indicated by a respective address signal $Addr_R$ (Address, Read) provided on the lines 10a of the bus system 10, and—at the same time or substantially the same time—the memory location of the array of flip-flops 6b into which data is to be written might be indicated by a respective address signal $Addr_W$ (Address, Write) provided on the lines 10d of the bus system 10. Hence, the above conflict is solved.

In all other cases ("non-conflict cases"), instead of the dual-ported array of Flip-Flops 6b, the above single-port RAM 6a, in particular single-port SRAM 6a of the data memory 6 is accessed.

In more detail, in the "non-conflict case", —depending on whether a read or a write access is to be carried out at a particular time (or a particular clock period or periods, defined by the above clock signal (CLK-signal))—either the signal /RE (Read Enable) on the line 10c of the bus system 10 is activated, but not the signal /WE (Write Enable) on the line 10f the bus system 10, or the signal /WE (Write Enable) on the line 10f the bus system 10, but not the signal /RE (Read Enable) on the line 10c of the bus system 10.

Further, —also depending on whether a read or a write access is to be carried out at the particular time/the particular clock period or periods—either the memory location of the single-port RAM 6a, in particular single-port SRAM 6a from which data is to be read out is indicated by a respective address signal $Addr_R$ (Address, Read) provided on the lines 10a of the bus system 10, or the memory location of the single-port RAM 6a, in particular single-port SRAM 6a into which data is to be written is indicated by a respective address signal $Addr_W$ (Address, Write) provided on the lines 10d of the bus system 10.

The sequence of instructions stored in the program memory 7 may be programmed such to ensure that in the above conflict case, the dual-ported array of flip-flops 6b of the data memory 6 is accessed (as described above), and in the non-conflict case, the single-port RAM 6a/SRAM 6a of the data memory 6 is accessed (as also described above).

Alternatively, in the conflict case, the address/addresses accessed by the respective instruction(s) may be mapped from a memory location/memory locations that form(s) part of the single-port RAM 6a/SRAM 6a of the data memory 6 to an address addresses of (a) memory location(s) that form(s) part of the dual-ported array of flip-flops 6b. This e.g., might be achieved by a corresponding conflict detection and address mapping logic provided in the CPU 8, or any other suitable control circuitry.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A memory device for a microprocessor or microcontroller, comprising:
a first part with memory cells that are single-port memory cells; and
a second part separate from the first part with memory cells that are dual-port memory cells, the device configured such that the microprocessor or microcontroller accesses the dual-port memory cells of the second part only during a conflict case when both a read and a write access are to be carried out at the memory device substantially simultaneously, and otherwise accesses the single-port memory cells.

2. The memory device of claim 1, wherein the first part of the memory device comprises at least one single-port RAM.

3. The memory device of claim 2, wherein the first part of the memory device comprises at least one single-port SRAM.

4. The memory device of claim 1, wherein the second part of the memory device comprises at least one flip-flop.

5. The memory device of claim 4, wherein the second part of the memory device comprises an array of flip-flops.

6. The memory device of claim 1, wherein the second part of the memory device comprises at least one dual-port RAM.

7. The memory device of claim 1, the memory device being an internal data memory for the microprocessor or microcontroller.

8. A microcontroller or microprocessor system, comprising: a memory device having a first part with at least one single-port memory and a second part separate from the first part with at least one dual-port memory, and a microprocessor or microcontroller adapted to access the dual-port memory of the second part of the memory device only when both a read and a write access are to be carried out at the memory device substantially simultaneously, and otherwise to access the single-port memory of the first part of the memory device when at a particular time or at a particular clock period only a read access, but not a write access, or only a write access, but not a read access is to be carried out at the memory device.

9. The microcontroller or microprocessor system of claim 8, wherein the single-port memory comprises at least one single-port RAM.

10. The microcontroller or microprocessor system of claim 9, wherein the single-port memory comprises at least one single-port SRAM.

11. The microcontroller or microprocessor system of claim 8, wherein the dual-port memory comprises at least one flip-flop.

12. The microcontroller or microprocessor system of claim 11, wherein the dual-port memory comprises an array of flip-flops.

13. The microcontroller or microprocessor system of claim 8, the memory device being a data memory for a microprocessor or microcontroller.

14. The microcontroller or microprocessor system of claim 13, wherein the microprocessor or microcontroller, and the memory device are provided on the same chip.

15. The microcontroller or microprocessor system of claim 13, wherein the microprocessor or microcontroller, and the memory device are provided on different chips.

16. The microcontroller or microprocessor system of claim 13, additionally comprising a program memory for the microprocessor or microcontroller.

17. A method for operating a memory device, the memory device comprising a first part with at least one single-port memory and a second part separate from the first part with at least one dual-port memory, the method comprising:
    accessing the dual-port memory of the second part of the memory device only when a conflicting access, comprising both a read and a write access, is to be carried out at the memory device; and
    otherwise accessing the single-port memory of the first part of the memory device.

18. A memory device for a microprocessor or microcontroller, comprising:
    a first part with memory cells that are single-port memory cells; and
    a second part separate from the first part with memory cells that are dual-port memory cells, the device configured such that the microprocessor or microcontroller accesses the dual-port memory cells of the second part only during a conflict case when both a read and a write access are to be carried out at the memory device substantially simultaneously, and otherwise accesses the single-port memory cells, wherein the conflict case comprises a write access of the memory device followed by an indirect addressing instruction.

* * * * *